(12) United States Patent
Okada et al.

(10) Patent No.: US 8,943,753 B2
(45) Date of Patent: Feb. 3, 2015

(54) VEHICLE DOOR FRAME WITH BELT-LINE REINFORCEMENT MEMBER

(75) Inventors: Takayuki Okada, Aichi (JP); Jun Kimura, Novi, MI (US)

(73) Assignee: Shiroki Corporation, Kanagawa (JP)

( * ) Notice: Subject to any disclaimer, the term of this patent is extended or adjusted under 35 U.S.C. 154(b) by 0 days.

(21) Appl. No.: 12/870,910

(22) Filed: Aug. 30, 2010

(65) Prior Publication Data

US 2011/0302846 A1 Dec. 15, 2011

(30) Foreign Application Priority Data

Jun. 11, 2010 (JP) ................................ 2010-133967

(51) Int. Cl.
*B60J 5/04* (2006.01)

(52) U.S. Cl.
USPC ........................ 49/502; 296/146.5; 296/146.6

(58) Field of Classification Search
USPC ................................ 49/502; 296/146.5, 146.6
See application file for complete search history.

(56) References Cited

U.S. PATENT DOCUMENTS

| | | | | |
|---|---|---|---|---|
| 3,868,141 A | * | 2/1975 | Johnson | 296/187.12 |
| 5,232,261 A | * | 8/1993 | Kuroda et al. | 296/146.4 |
| 5,379,553 A | * | 1/1995 | Kimura et al. | 49/502 |
| 6,227,609 B1 | * | 5/2001 | Mellis | 296/146.6 |
| 6,302,473 B1 | * | 10/2001 | Weber | 296/146.6 |
| 6,450,565 B2 | * | 9/2002 | Yamamoto | 296/187.09 |
| 7,566,091 B2 | * | 7/2009 | Yagi | 296/146.6 |
| 7,959,212 B2 | * | 6/2011 | Gress et al. | 296/146.5 |
| 2003/0140566 A1 | * | 7/2003 | Sommer et al. | 49/502 |
| 2004/0123526 A1 | * | 7/2004 | Hock et al. | 49/502 |
| 2004/0216387 A1 | * | 11/2004 | Furuse | 49/502 |
| 2006/0064938 A1 | * | 3/2006 | Unterreiner et al. | 49/502 |
| 2007/0108794 A1 | * | 5/2007 | Yagi | 296/146.6 |
| 2007/0145770 A1 | * | 6/2007 | Katou et al. | 296/146.6 |

FOREIGN PATENT DOCUMENTS

| | | | |
|---|---|---|---|
| JP | 2002-154326 A | 5/2002 |
| JP | 2003-311453 A | 11/2003 |
| JP | 2005-144504 A | 6/2005 |
| JP | 2008-201304 A | 9/2008 |

* cited by examiner

*Primary Examiner* — Gregory J Strimbu
(74) *Attorney, Agent, or Firm* — Millen, White, Zelano & Branigan, P.C.

(57) ABSTRACT

A vehicle door frame includes a door sash, a belt-line reinforcement member, and a bracket which connects the door sash and the belt-line reinforcement member to each other and is fixed to a door panel. The bracket is welded to the belt-line reinforcement member at a plurality of welding portions, each of the welding portions defining a welding line, where an extension of each of the welding lines are not aligned with one another.

5 Claims, 11 Drawing Sheets

VEHICLE DOOR FRAME WITH BELT-LINE REINFORCEMENT MEMBER

BACKGROUND OF THE INVENTION

1. Field of the Invention

The present invention relates to a vehicle door frame which includes a door sash, a bracket and a belt-line reinforcement member. The bracket and the belt-line reinforcement member are provided in a lower part of the door sash.

2. Description of Related Art

Among vehicle door frames having a belt-line reinforcement member provided in a lower part of a door sash that is shaped along a profile of a door window pane, a type of a vehicle door frame which includes a bracket provided at a corner of the door frame between the door sash and an end of the belt-line reinforcement member is known in the art; such a bracket is fixed to a door panel. This type of vehicle door frame is disclosed in. e.g., Japanese Patent No. 4,463,777.

In the aforementioned type of vehicle door frame, since a joint between the belt-line reinforcement member and the bracket is positioned at a midpoint on a side frame of the vehicle door frame, the vehicle door frame is required to have a sufficient strength especially at this particular joint. More specifically, in the case where the joint is a welded joint, the vehicle door frame is required to have a high buckling strength and have a heat-distortion resistant structure at the joint.

SUMMARY OF THE INVENTION

The present invention provides a simple-structured vehicle door frame that exhibits a high strength at a joint between the belt-line reinforcement member and the bracket at low cost.

According to an aspect of the present invention, a vehicle door frame is provided, including a door sash, a belt-line reinforcement member, and a bracket which connects the door sash and the belt-line reinforcement member to each other and is fixed to a door panel. The bracket is welded to the belt-line reinforcement member at a plurality of welding portions, each of the welding portions defining a welding line, wherein extended lines of a plurality of the welding lines do not coincide with one another. Note that the term "welding line" denotes an assumed line that is defined by a welding portion that extends in a single line.

According to the present invention, a vehicle door frame exhibiting high strength at the joint between the belt-line reinforcement member and the bracket is achieved by a simple and low-cost structure in which the welding lines, which are each defined by a welding portion, are offset from each other.

It is desirable for the plurality of welding portions to be arranged at different positions in a lengthwise direction of the belt-line reinforcement member.

It is desirable for the plurality of welding lines, which are respectively defined by the plurality of welding portions, to be nonparallel to one another as viewed from one of a vehicle exterior side and a vehicle interior side of the vehicle door frame.

It is desirable for the plurality of welding portions to be arranged at different positions in a direction of thickness of the vehicle door frame.

In an embodiment, a vehicle door frame is provided, including a door sash, a belt-line reinforcement member, and a bracket via which one end of the door sash and one end of the belt-line reinforcement member are connected to each other and is fixed to a door panel. The bracket is welded to the belt-line reinforcement member along two independent lines that are not aligned with each other.

It is desirable for the two independent lines to be parallel to each other.

It is desirable for the two independent lines to be nonparallel to each other.

The present disclosure relates to subject matter contained in Japanese Patent Application. No. 2010-133967 (filed on Jun. 11, 2010) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
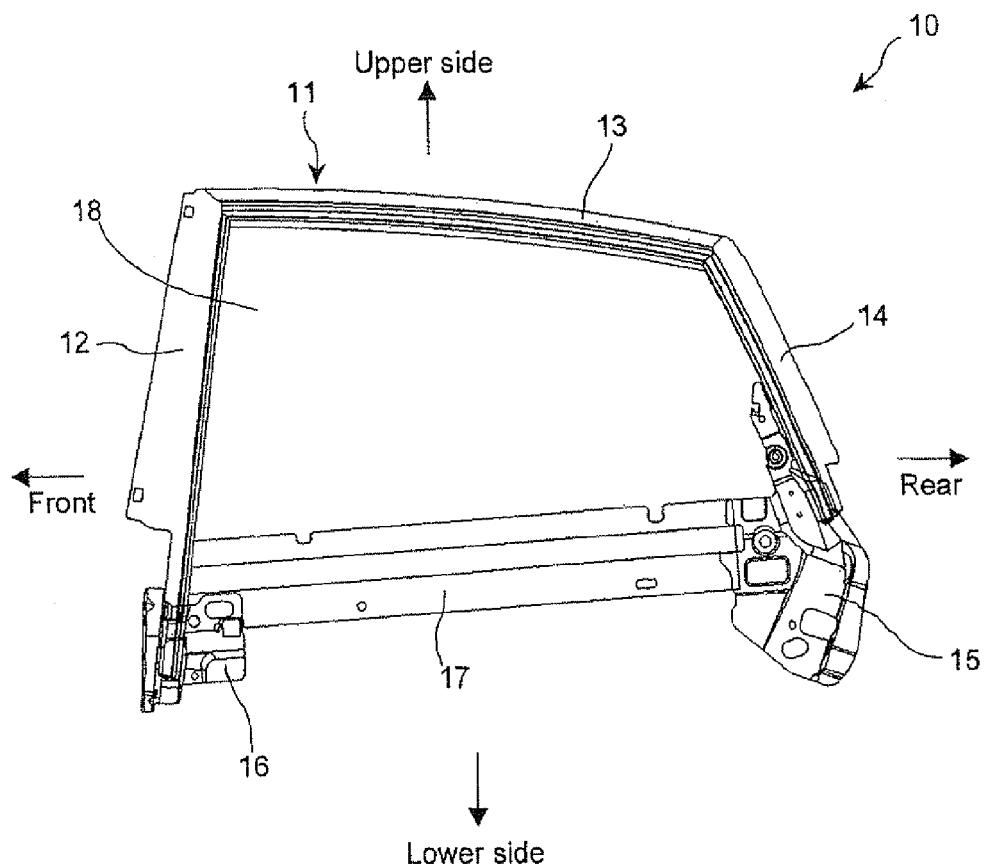
FIG. 1 is a side elevational view of a vehicle door frame according to the present invention which is composed of a door sash, a belt-line reinforcement member and two brackets (front and rear brackets)

FIG. 1 shows a door frame 10 of the rear door of an automobile (vehicle). In the following descriptions, the terms "forward/rearward direction" and "upward/downward (vertical) direction" refer to the forward/rearward direction and the upward/downward (vertical) direction of the vehicle, respectively. The door frame 10 is in the shape of a quadrangular frame, the four sides of which include a door sash (window frame) 11 and a belt-line reinforcement member 17. The door sash 11 is shaped along a profile of a window pane (not shown), and the belt-line reinforcement member 17 is positioned at a lower part of the door sash 11 and extends in the forward/rearward direction of the vehicle. The door frame 10 is provided, at a corner (lower right corner with respect to FIG. 1) thereof between the door sash 11 and the rear end of the belt-line reinforcement member 17, with a bracket (rear bracket) 15. More specifically, the door sash 11 is provided with a vertical-pillar sash 12, an upper sash and a rear sash 14. The vertical-pillar sash 12 is positioned at the front of the door sash 11 and extends vertically, the upper sash 13 extends rearward from the upper end of the vertical-pillar sash 12, and the rear sash 14 extends obliquely downwards from the rear end of the upper sash 13. The bracket 15 is fixed to a lower part of the rear sash 14, and of the rear end of the belt-line reinforcement member 17 is joined to the bracket 15 by welding. The front end of the belt-line reinforcement member 17 is fixed to of the lower end of the vertical-pillar sash 12. The door frame 10 is provided with another bracket (front bracket) 16 which is fixed to the belt-line reinforcement member 17 at the front end thereof. The rear bracket 15 and the front bracket 16 are fixed to a door panel (inner panel; not shown) which constitutes a main body of the door. The door sash 11 forms a window opening 18 surrounded by the vertical-pillar sash 12, the upper sash 13 and the rear sash 14, and the window pane moves up and down in the window opening 18. The above described elements of the door frame 10 are, e.g., products molded/press-formed out of light alloy (e.g., aluminum alloy).

First through fourth embodiments of the joining structure at the joint between the rear bracket 15 and the belt-reinforcement 17 of the door frame 10 will be hereinafter discussed in detail with reference to FIGS. 2 through 11.

Figure 2:
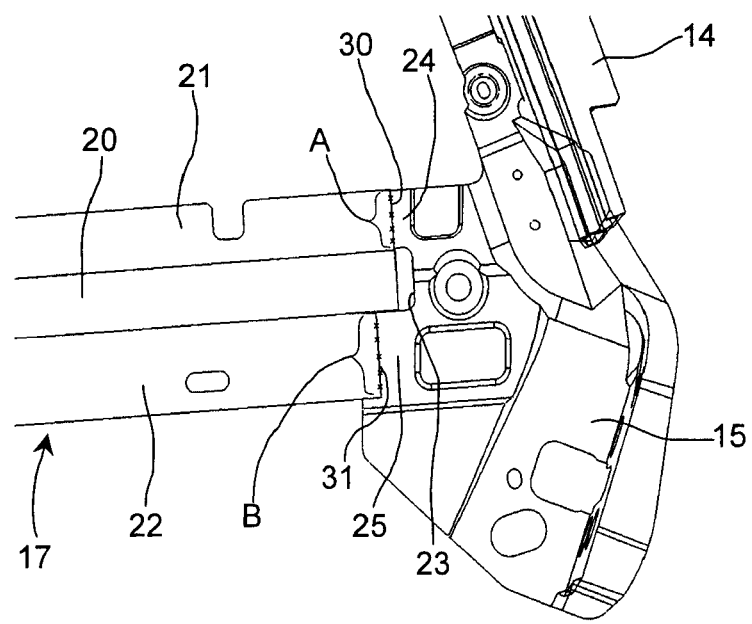
FIG. 2 is a side elevational view of a portion of the vehicle door frame shown in FIG. 1 in the vicinity of the welded joint between the belt-line reinforcement member and the rear bracket, showing a first embodiment of a joining structure.
Figure 3:
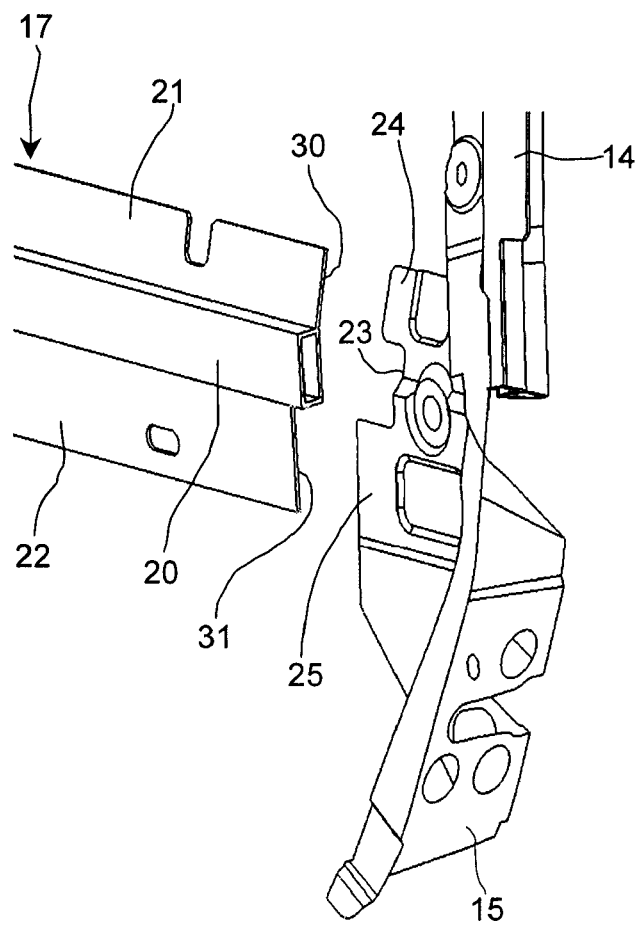
FIG. 3 is a perspective view of the portion of the vehicle door frame shown in FIG. 2 before the belt-line reinforcement member and the rear bracket are joined together by welding.
Figure 4:
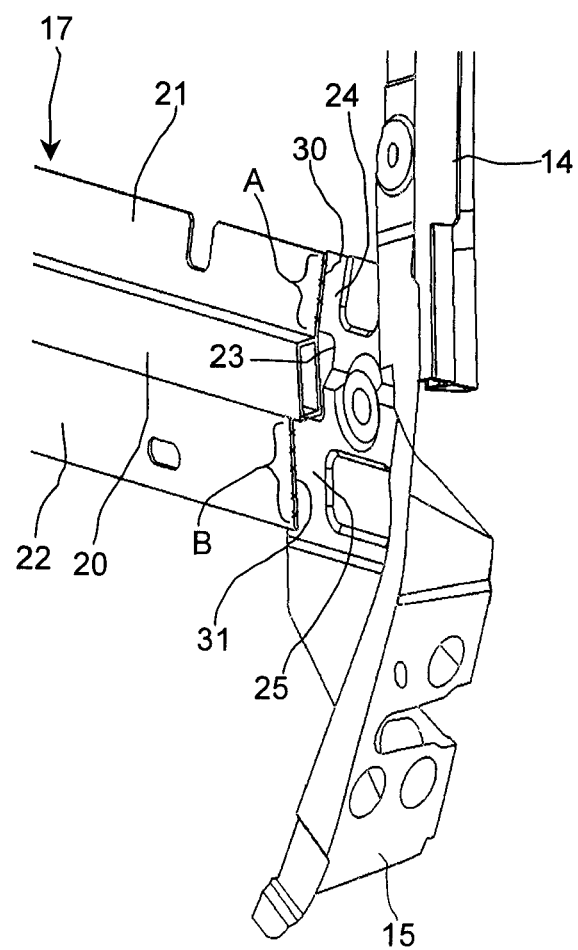
FIG. 4 is a perspective view of the portion of the vehicle door frame shown in FIG. 2 after the belt-line reinforcement member and the rear bracket are joined together by welding.

FIGS. 2 through 4 show the first embodiment of the joining structure. As shown in FIG. 3, the belt-line reinforcement member 17 is provided with a rectangular hollow section 20, an upper flange 21 in the shape of a flat plate which extends upward from the rectangular hollow section 20, and a lower flange 22 in the shape of a flat plate which extends downward from the rectangular hollow section 20. The rear bracket 15 is provided with a recess 23, an upper overlay 24 and a lower overlay 25. The recess 23 allows the rear end of the rectangular hollow section 20 of the belt-line reinforcement member 17 to be inserted into the recess 23. The upper overlay 24 is positioned immediately above the recess 23 and can be overlaid on the upper flange 21. The lower overlay 25 is positioned immediately below the recess 23 and can be overlaid on the lower flange 22.

As shown in FIG. 2, in the belt-line reinforcement member 17, the positions of a rear end surface (upper rear end surface) 30 of the upper flange 21 and a rear end surface (lower rear end surface) 31 of the lower flange 22 are made to differ from each other in the forward/rearward direction. More specifically, the upper rear end surface 30 and the lower rear end surface 31 extend substantially orthogonal to the lengthwise direction of the belt-line reinforcement member 17 and are substantially parallel to each other; however, the upper rear end surface 30 is offset with respect to the lower rear end surface 31 in the rearward direction (i.e., rearwardly in the lengthwise direction of the belt-line reinforcement member 17). Therefore, when the upper overlay 24 and the lower overlay 25 are overlaid on the upper flange 21 and the lower flange 22 of the belt-line reinforcement member 17, respectively, as shown in FIGS. 2 and 4 (at this time, the rear end of the rectangular hollow section 20 enters the recess 23), the border (border line) between the upper flange 21 (the upper rear end surface 30) and the upper overlay 24 and the border (border line) between the lower flange 22 (the lower rear end surface 31) and the lower overlay 25 are positioned at forwardly/rearwardly offset positions from each other. The rear bracket 15 and the belt-line reinforcement member 17 are joined together by welding. The aforementioned term "welding line" denotes an assumed line that is defined by a welding portion that extends in a single line, and the rear bracket 15 and the belt-line reinforcement member 17 are welded to each other at the following two welding portions: a welding portion A that defines a welding line extending along the upper rear end surface 30 and a welding portion B that defines a welding line extending along the lower rear end surface 31.

By offsetting the two welding portions A and B, which are for joining the rear bracket 15 and the belt-line reinforcement member 17 to each other, in the forward/rearward direction, i.e., in the lengthwise direction of the belt-line reinforcement member in the above described manner, an extended line of the welding line defined by the welding portion A and an extended line of the welding line defined by the welding portion B do not coincide with each other (i.e., the welding line defined by the welding portion A and the welding line defined by the welding portion B are not aligned). This joining structure has merits which will be discussed hereinafter.

First of all, according to the above-described joining structure, an effect of improvement in buckling strength of the joint between the belt-line reinforcement member 17 and the rear bracket 15 is obtained. As described above, the door frame 10 is in the shape of a quadrangular frame, the four sides of which include the vertical-pillar sash 12, the upper sash 13 and the rear sash 14 and the belt-line reinforcement member 17, and among these four sides, the rear sash 14 and the belt-line reinforcement member 17 are connected to each other via the rear bracket 15 which is provided as a separate member from the rear sash 14 and the belt-line reinforcement member 17. In other words, among the four sides of the door frame 10, only the belt-line reinforcement member 17 side (i.e., lower side) has a structure having a joint (the welding portions A and B) to the rear bracket 15 at positions partway along this side. Unlike the present embodiment of the joining structure, assuming that the two welding portions corresponding to the two welding portions A and B between the rear bracket 15 and the belt-line reinforcement member 17 were not offset from each other in the forward/rearward direction, i.e., that the two welding lines were aligned, these two aligned welding portions (the two welding lines) would become susceptible to serving as an axis about which the door frame 10 can bend upon a bending force being exerted on the door frame 10. Whereas, according to the above described embodiment of the joining structure, since the forward/rearward positions of the two welding lines, which are respectively defined by the two welding portions A and B, are made to differ from each other by forwardly/rearwardly offsetting the two welding portions A and B, the resistance to a bending force at the joint between the rear bracket 15 and the belt-line reinforcement member 17 is high, and hence, the strength of the joining structure between the rear bracket 15 and the belt-line reinforcement member 17 is increased.

In addition, according to the above described embodiment of the joining structure, since the forward/rearward positions of the two welding lines are made to differ from each other by forwardly/rearwardly offsetting the two welding portions A and B, the door frame 10 becomes less subject to the effects of heat distortion caused by welding at the welding portions A and B.

Figure 5:
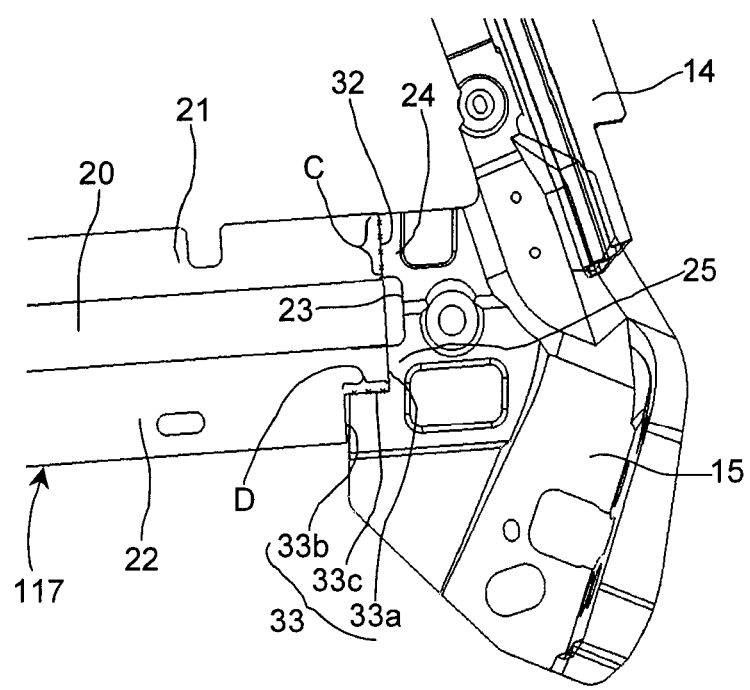
FIG. 5 is a side elevational view of a portion of the vehicle door frame shown in FIG. 1 in the vicinity of the welded joint between the belt-line reinforcement member and the rear bracket, showing a second embodiment of the joining structure.
Figure 6:
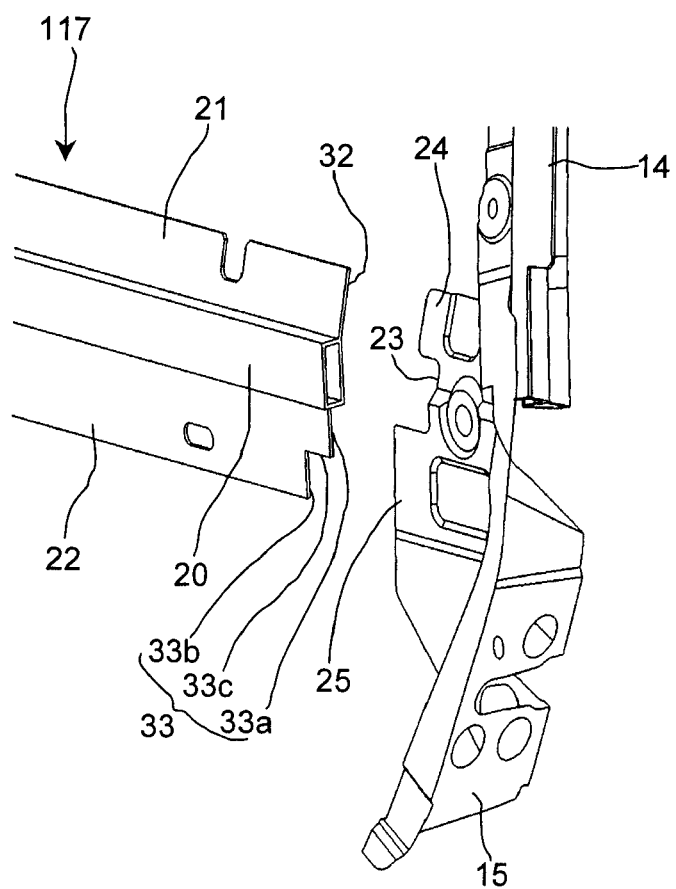
FIG. 6 is a perspective view of the portion of the vehicle door frame shown in FIG. 5 before the belt-line reinforcement member and the rear bracket are joined together by welding.
Figure 7:
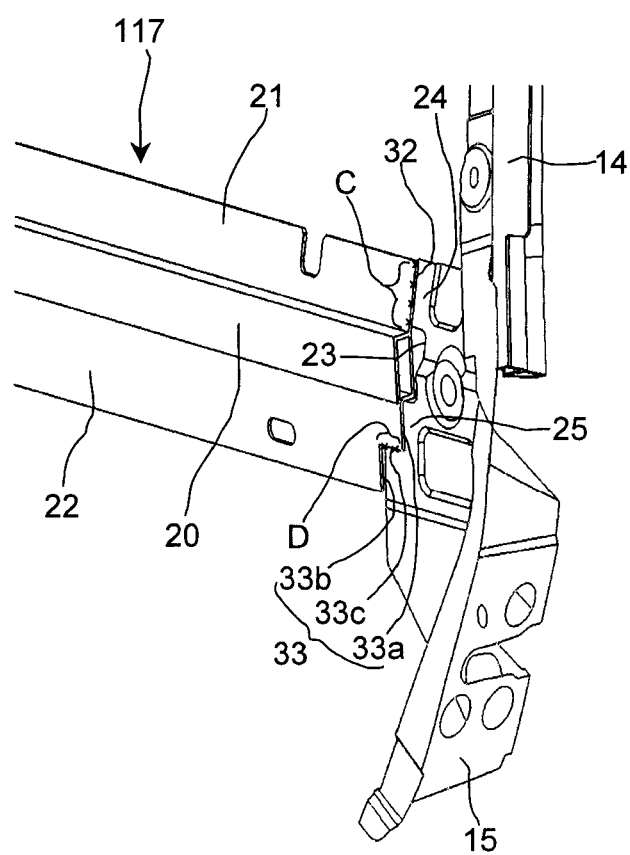
FIG. 7 is a perspective view of the portion of the vehicle door frame shown in FIG. 5 after the belt-line reinforcement member and the rear bracket are joined together by welding.

FIGS. 5 through 7 show a second embodiment of the joining structure. The rear bracket 15 in this embodiment is identical in structure to that of the first embodiment of the joining structure. A belt-line reinforcement member 117 in this embodiment is also identical in cross sectional shape to the belt-line reinforcement member 17 in the first embodiment of the joining structure. The difference between the first embodiment and the second embodiment is that the rear end of the belt-line reinforcement member 117 in the second embodiment is different in shape from that of the belt-line reinforcement member 17 in the first embodiment.

More specifically, a rear end surface (upper rear end surface) 32 of the upper flange 21 of the belt-line reinforcement member 117 is formed as a single straight edge surface which extends substantially orthogonal to the lengthwise direction of the belt-line reinforcement member 117, similar to the upper rear end surface 30 in the first embodiment of the joining structure, whereas a lower end surface (lower rear end surface) 33 of the lower flange 22 of the belt-line reinforcement member 117 is formed by a combination of a plurality of edge surfaces that define a stepped shape. More specifically, the lower rear end surface 33 is provided with two vertical edge surfaces 33a and 33b which are substantially parallel to the upper rear end surface and offset from each other in the forward/rearward direction, and a lengthwise edge surface 33c which extends in the lengthwise direction of the belt-line reinforcement member 117 to connect the two vertical edge surfaces 33a and 33b to each other.

When the rear bracket 15 and the belt-line reinforcement member 117 are joined to each other, the upper flange 21 and the upper overlay 24 are welded to each other at a welding portion C similar to the welding portion A of the first embodiment of the joining structure. Namely, a welding line that is defined by the welding portion C is formed along the upper rear end surface 32. On the other hand, the lower flange 22 and the lower overlay 25 are welded to each other at a welding portion D (welding line) along the lengthwise edge surface 33c. Similar to the welding lines defined by the welding portions A and B in the first embodiment of the joining structure, an extended line of the welding line defined by the welding portion C and an extended line of the welding line defined by the welding portion D do not coincide with each other (i.e., the welding line defined by the welding portion C and the welding line defined by the welding portion D are not aligned), and accordingly, the joining structure between the rear bracket 15 and the belt-line reinforcement member 117 is superior in bending rigidity and resistance to heat distortion.

Figure 8:
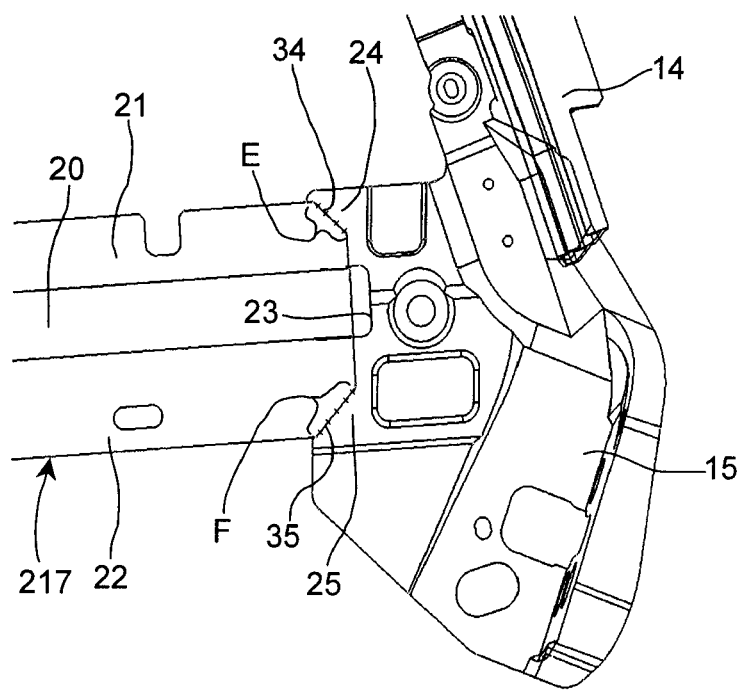
FIG. 8 is a side elevational view of a portion of the vehicle door frame shown in FIG. 1 in the vicinity of the welded joint between the belt-line reinforcement member and the rear bracket, showing a third embodiment of the joining structure.
Figure 9:
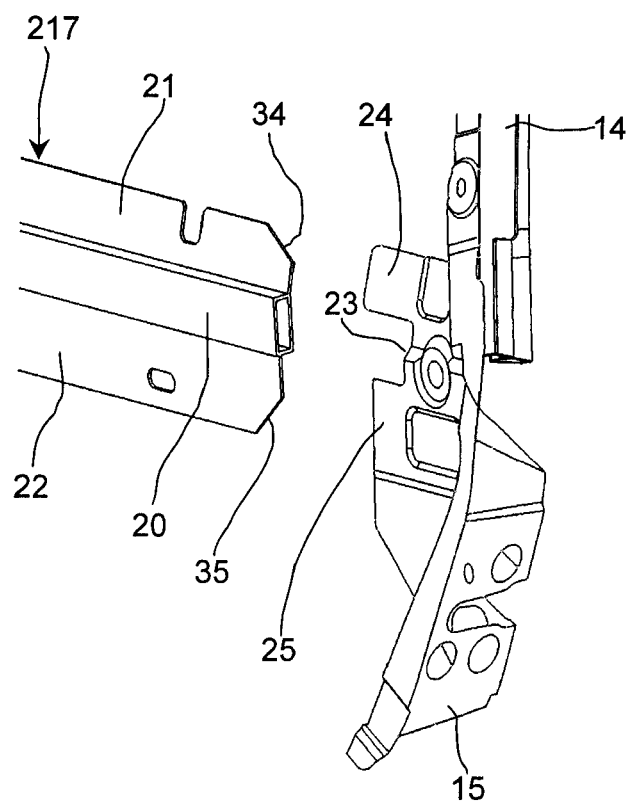
FIG. 9 is a perspective view of the portion of the vehicle door frame shown in FIG. 8 before the belt-line reinforcement member and the rear bracket are joined together by welding.
Figure 10:
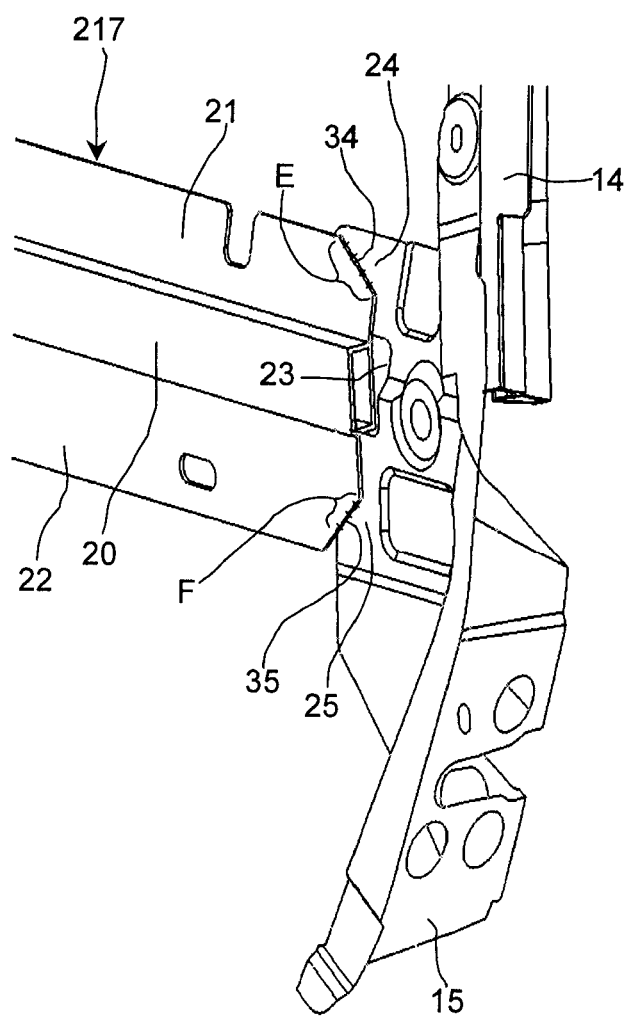
FIG. 10 is a perspective view of the portion of the vehicle door frame shown in FIG. 8 after the belt-line reinforcement member and the rear bracket are joined together by welding.

FIGS. 8 through 10 show a third embodiment of the joining structure. In this embodiment, the rear bracket 15 is identical in structure to that in each of the first and second embodiments of the joining structures except that the amount of projection of the upper overlay 24 in the forward direction is greater than that in each of the first and second embodiments of the joining structures to secure a sufficient amount of overlapping between the rear bracket 15 and a belt-line reinforcement member 217. The belt-line reinforcement member 217 is identical in cross sectional shape to that in each of the first and second embodiments of the joining structures but has a different rear end shape.

More specifically, a rear end surface (upper rear end surface) 34 of the upper flange 21 and a rear end surface (lower rear end surface) 35 of the lower flange 22 are formed as beveled surfaces which are forwardly beveled in opposite inclination directions so as to gradually increase the width (vertical distance) therebetween. The rear bracket 15 and the belt-line reinforcement member 217 are welded to each other at a welding portion E along the upper rear end surface 34 and a welding portion F along the lower rear end surface 35. Similar to the two welding lines respectively defined by the two welding portions A and B in the first embodiment of the joining structure and the two welding lines respectively defined by the two welding portions C and D in the second embodiment of the joining structure, an extended line of the welding line that is defined by the welding portion E and an extended line of the welding line that is defined by the welding portion F do not coincide with each other (i.e., the welding line defined by the welding portion E and the welding line defined by the welding portion F are not aligned), and accordingly, the joining structure between the rear bracket 15 and the belt-line reinforcement member 217 is superior in bending rigidity and resistance to heat distortion.

Contrary to the direction of inclination of the upper rear end surface 34 of the upper flange 21 and the lower rear end surface 35 of the lower flange 22 in the third embodiment of the joining structure, it is possible that the direction of inclination of the upper rear end surface 34 of the upper flange 21 and the lower rear end surface 35 of the lower flange 22 be such that the upper rear end surface 34 and the lower rear end surface 35 are rearwardly beveled in the opposite inclination directions so as to gradually increase the width (vertical distance) therebetween.

Figure 11:
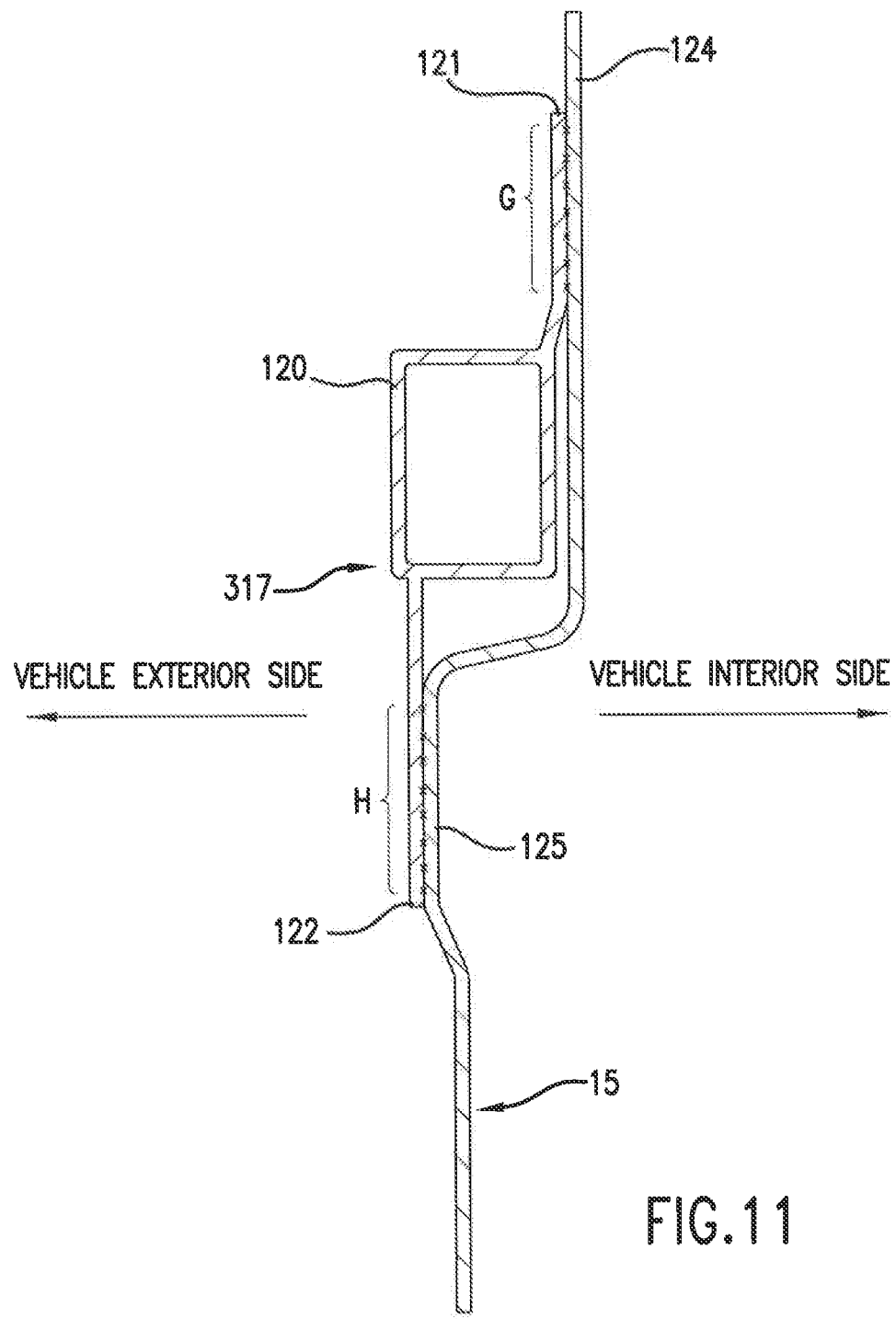
FIG. 11 is a cross view of a portion of the vehicle door frame shown in FIG. 1 in the vicinity of the welded joint between the belt-line reinforcement member and the rear bracket, showing a fourth embodiment of the joining structure.

FIG. 11 shows a fourth embodiment, of the joining structure. The two welding portions for welding the rear bracket 15 and the belt-line reinforcement member (17, 117 or 217) to each other are offset from each other, as viewed from either side (vehicle exterior or interior side) of the door frame 10, in each of the above described first through third embodiments of the joining structures, whereas two welding portions G and H for welding the rear bracket 15 and a belt-line reinforcement member 317 to each other are offset from each other in a vehicle inward/outward direction (the direction of thickness of the door frame 10/the horizontal direction with respect to FIG. 11).

More specifically, an upper flange 121 and a lower flange 122 of the belt-line reinforcement member 317, which extend upward and downward from a hollow rectangular hollow section 120 of the belt-line reinforcement member 317, respectively, are offset from each other in the direction of thickness of the door frame 10 to be positioned closer to the vehicle interior side (to the right-hand side with respect to FIG. 11) and the vehicle exterior side (to the left-hand side with respect to FIG. 11), respectively. Correspondingly, the rear bracket 15 is shaped so that an upper overlay 124 and a lower overlay 125 thereof are positioned closer to the vehicle interior side and the vehicle exterior side, respectively. In addition, a welding portion G between the upper flange 121 and the upper overlay 124 and a welding portion H between the lower flange 122 and the lower overlay 125 are offset from each other in the vehicle inward/outward direction, and an extended line of the welding line that is defined by the welding portion G and an extended line of the welding line that is defined by the welding portion H do not coincide with each other (i.e., the welding line defined by the welding portion G and the welding line defined by the welding portion H are not aligned), and accordingly, the joining structure between the rear bracket 15 and the belt-line reinforcement member 317 is superior in bending rigidity and resistance to heat distortion, similar to each of the above described first through third embodiments of the joining structures.

Although the present invention has been described based on the above illustrated embodiments of the joining structures, the present invention is not limited solely to these particular embodiments. For instance, although the two welding lines respectively defined by the upper and lower welding portions (the welding portions A and B, C and D, or E and F) are made so as not to be aligned by varying the relative position, shape, orientation or the like of the rear ends (the rear end surfaces 30 through 35) of the upper flange 21 and the lower flange 22 of the belt-line reinforcement member 17, 117, 217 or 317 in each of the first through fourth embodiments of the joining structures, similar effects can be obtained by giving variations to the relative position, shape, orientation or the like of the front ends (front edges) of the upper overlay 24 and the lower overlay 25 of the bracket 15.

The present invention has been applied to the joining structure between a bracket and a belt-line reinforcement member at a rear corner of a door frame which serves as an element of a rear door of an automobile in each of the above described embodiments; however, in the case where the joining structure is of a type in which a bracket and a belt-line reinforcement member are joined to each other at a front corner of a door frame, the present invention can also be applied similarly to this joining structure between the bracket and the belt-line reinforcement member. In addition, the present invention can be applied not only to a door frame of a rear door but also a door frame of a front door as long as the door frame includes a welded joint between a bracket and a belt-line reinforcement member.

Although two welding portions are provided between a bracket and a belt-line reinforcement member in each of the above described first through fourth embodiments of the joining structures, it is possible for the bracket and the belt-line reinforcement member to be joined to each other at more than two welding portions. In this case, extended lines of the welding lines that are respectively defined by more than two welding portions can be made not to coincide with one another (i.e., the welding lines respectively defined by more than two welding portions can be made so as not to be aligned).

In addition, although the present invention is suitable especially when the material of a door frame which includes a belt-line reinforcement member and a bracket is a light metal (light alloy) such as aluminum (or aluminum alloy), the present invention can also be applied to a door frame made of a material other than a light metal such as iron.

Obvious changes may be made in the specific embodiments of the present invention described herein, such modifications being within the spirit and scope of the invention claimed. It is indicated that all matter contained herein is illustrative and does not limit the scope of the present invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding Japanese application No. 2010-133967, filed Jun. 11, 2010 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A vehicle door sash comprising:
an upper sash, a pillar sash and a rear sash, a proximal end portion of said pillar sash being mounted on a first end of said upper sash, and a proximal end portion of said rear sash being mounted on a second end of said upper sash;
a belt-line reinforcement member extending between a distal end portion of said pillar sash and a distal end portion of said rear sash and having a length defined between distal ends thereof, said belt-line reinforcement member including upper and lower flanges and a hollow section, wherein said hollow section is disposed between said upper flange and said lower flange, and said upper and lower flanges and said hollow section each extends substantially the length of said belt-line reinforcement member;
a bracket which connects said rear sash and said belt-line reinforcement member, wherein said bracket is adapted to be fixed to a door panel,
wherein said bracket includes a upper overlay and a lower overlay with a recess disposed between said upper overlay and said lower overlay, wherein a distal end of said hollow section is disposed within said recess, a distal end edge portion of said upper flange is welded to said upper overlay, and a distal end edge portion of said lower flange is welded to said lower overlay, and
wherein an entire length of each of the distal end edge portions of said upper and lower flanges extends generally perpendicular to a longitudinal axis of said hollow section, wherein the distal end edge portion of one of said upper and lower flanges terminates substantially at one of the distal ends of said belt-line reinforcement member and wherein the distal end edge portion of the other of said upper and lower flanges terminates before the one of the distal ends of said belt-line reinforcement member.

2. The vehicle door sash according to claim 1, wherein said welds between said flanges and said bracket are weld lines.

3. The vehicle door according to claim 1, wherein said hollow section comprises a rectangular hollow section.

4. The vehicle door sash according to claim 1, wherein the distal end edge portion of said upper flange and the distal end edge portion of said lower flange are nonparallel with each other.

5. The vehicle door sash according to claim 1, wherein said upper and lower flanges include beveled surfaces.

* * * * *